Patented Aug. 9, 1927.

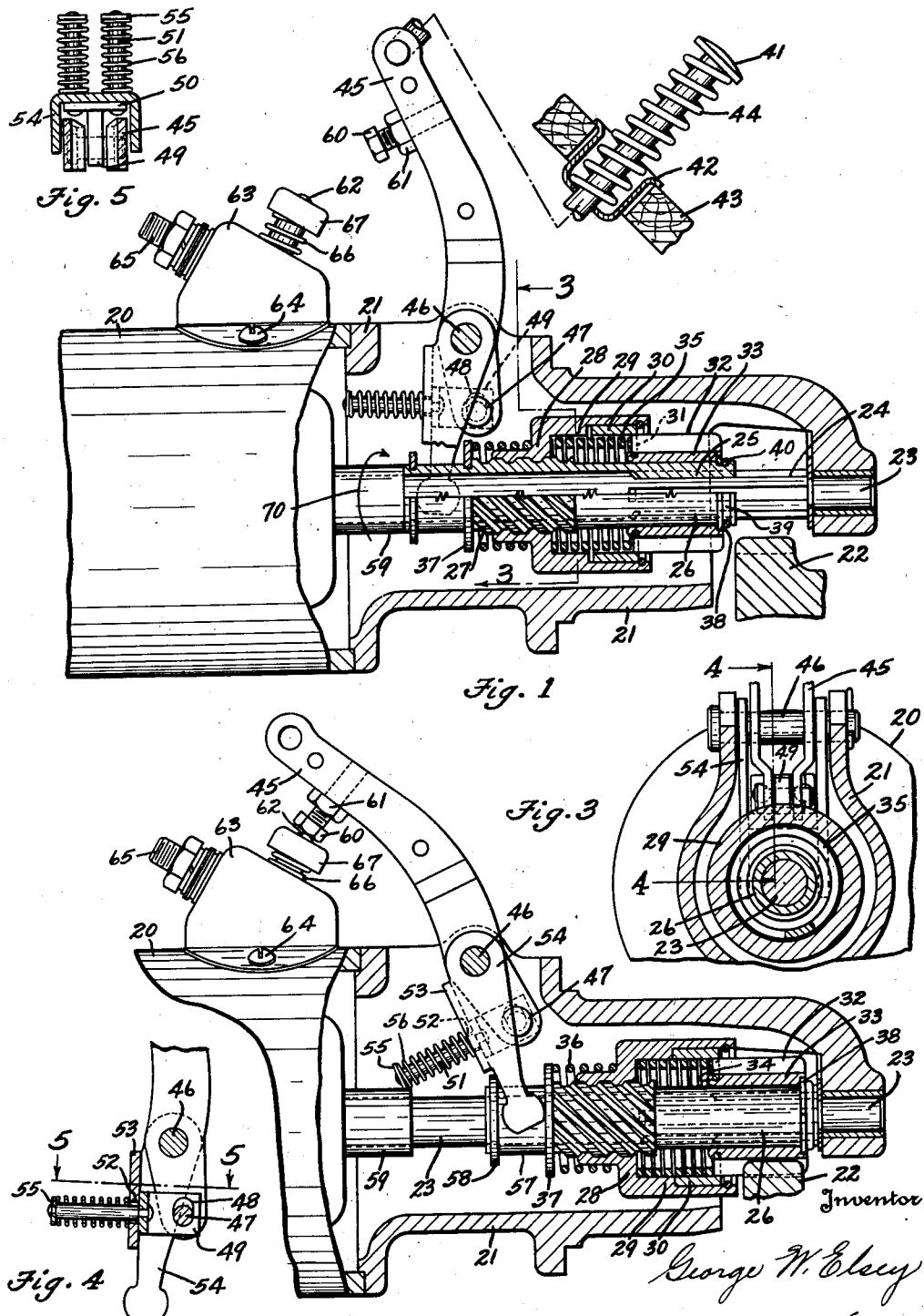

1,638,248

UNITED STATES PATENT OFFICE.

GEORGE W. ELSEY, OF ANDERSON, INDIANA, ASSIGNOR, BY MESNE ASSIGNMENTS, TO DELCO-REMY CORPORATION, OF DAYTON, OHIO, A CORPORATION OF DELAWARE.

ENGINE-STARTING APPARATUS.

Application filed January 12, 1926. Serial No. 80,761.

This invention relates to apparatus for starting internal combustion engines and particularly to the type of apparatus which includes a motor, a pinion driven by the motor and movable endwise into engagement with the gear of an engine to be started, and a one-way clutch for connecting the pinion with the motor so that the pinion may overrun the motor shaft when the engine becomes self-operative.

It is an object of the present invention to simplify the construction and improve the operation of the overrunning clutch referred to. To this end, the invention provides a clutch comprising two coaxial clutch drums one of which is connected with the pinion and the other with the motor, a helical spring normally out of driving engagement with the clutch drums, and means responsive to the operation of the motor after the pinion has been meshed with the engine gear for causing the spring to be stressed axially so that its convolutions will engage the clutch drums and provide a connection between the motor and the pinion.

Further objects and advantages of the present invention will be apparent from the following description, reference being had to the accompanying drawings, wherein a preferred form of embodiment of the present invention is clearly shown.

In the drawings:

Figs. 1 and 2 are fragmentary side views partly in section of the form of starting apparatus embodying the present invention. Fig. 1 shows the apparatus disconnected from the engine, and Fig. 2 drivingly connected with the engine.

Fig. 3 is a sectional view on line 3—3 of Fig. 1.

Fig. 4 is a sectional view on the line 4—4 of Fig. 3.

Fig. 5 is a sectional view on the line 5—5 of Fig. 4.

Referring to the drawings, numeral 20 designates the field frame of an electric motor, the frame being attached to a gear housing 21 adapted to be supported by the frame of the engine to be started. The engine is not shown but is represented by a flywheel gear shown in section at 22. The field frame 20 and the housing 21 support an armature shaft 23 having a splined portion 24 which is engaged by the splines 25 of a sleeve 26 which is slidable along the shaft 24. The sleeve 26 is provided with a screw-threaded portion 27 adapted to be engaged by a nut 28 provided with a clutch drum member 29. The drum member 29 is coaxial with a drum member 30 having a flange 31 which is notched to receive the teeth 32 of a pinion 33 which is rotatably supported by the sleeve 26. The flange 31 of the clutch drum member 30 is maintained in driving engagement with the pinion teeth 32 by riveting over against said flange 31 the hub of the pinion 33 as indicated at 34. The clutch drums 29 and 30 enclose a helical clutch spring 35. The convolutions of this spring are normally out of driving engagement with the drums 29 and 30 as shown in Fig. 1. The end faces of the spring 35 are maintained in slight frictional contact with the nut 28 and the flange 31 and ends of the pinion teeth 32 by a relatively light spring 36 which is located between the nut 28 and a collar 37 attached to the sleeve 26. Movement of the pinion 33 relative to the sleeve 26 toward the right is limited by a pair of half-washers 38 which are received by a groove 39 in the sleeve 26 and by a suitable recess in the hub of the pinion 33. These half-washers are retained by a wire split ring 40 located in the groove 39.

The mechanism for moving the sleeve 26 endwise comprises, a pedal 41 movable through a cup shaped washer 42 attached to the floor-board 43 of an automobile. A spring 44 maintains the pedal in the upper position as shown in Fig. 1. The pedal 41 is attached to a pedal lever 45 which is mounted on a rod 46 supported by the housing 21. The lower end of lever 45 carries a rod 47 which is received by a slot 48 provided in the stem portion 49 of a block 50 which is T shaped in plan view as shown in Fig. 5. The block 50 is attached to two studs 51 which extend through holes 52 in the yoke 53 of a bifurcated lever 54 which is also pivotally supported by the rod 46. Each stud 51 carries a washer 55 and is surrounded by spring 56 which is located between the washer 55 and the yoke 53. The springs 56 are initially compressed so as to maintain the T shaped block 50 in engagement with the lever yoke 53. The lower ends of the lever 54 are received by a groove 57 which is provided between the washer 37 and a washer 58 attached to the sleeve 26. The spring 44 acting through the pedal 41, pedal lever 45, block 50 and lever 54 causes the sleeve 26 to be maintained normally in contact with a stop member 59 provided by the shaft 23.

The lever 45 carries a screw 60 maintained in adjusted position by lock nut 61. The screw 60 engages the plunger 62 of a motor switch which is enclosed by a switch case 63 attached by screws 64 to the motor frame 20. The switch case 63 encloses stationary contacts, one of which is attached to the motor field winding and the other to a terminal 65 which is adapted to receive a wire leading from a storage battery or other current source. The case 63 encloses also a movable contact attached to the lower end of the plunger 62. A spring 66 is located between the switch case 63 and a cap 67 attached to the plunger 62 and normally maintains the plunger in switch-open position.

To start the engine the operator presses the pedal 41 to cause the lever 45 to move from the position shown in Fig. 1 to that shown in Fig. 2. Provided the pinion teeth 32 do not abut the teeth of the flywheel gear 22, the pinion will be moved into mesh with the engine gear before the motor is caused to operate by the closing of the motor switch which occurs when the screw 60 engages the plunger 62 and moves it into the position shown in Fig. 2. When the motor switch is closed the shaft 23 will rotate in the direction of the arrow 70 and will cause the sleeve 26 to be rotated in the same direction. Since the pinion is prevented from rotating by its engagement with the gear 22, the spring 35 will tend to remain stationary due to the friction between its end face and the ends of the pinion teeth 32 and the flange 31. Consequently, since there is friction between the end face of the spring 35 and the nut 28, the nut 28 will tend to remain stationary. Therefore the rotation of the screw threads 27 in the direction of the arrow 70 will cause the nut 28 to be moved toward the pinion 33, and this will cause the spring 35 to be compressed and its convolutions to expand into driving engagement with the clutch drums 29 and 30 as shown in Fig. 2. In this manner the clutch connects the pinion 33 with the motor shaft 23 so that the motor may crank the engine. When the engine becomes self-operative, it will rotate the pinion 33 faster than the pinion can be rotated by the motor, therefore the pinion will become a member tending to drive the motor. This condition will cause the nut 28 to be threaded along the sleeve 26 toward the left thereby causing the spring 35 to be released and its convolutions to decrease in diameter so that they will be out of driving engagement with the clutch drums 29 and 30. Therefore, the pinion 33 will overrun the sleeve 26 and the motor shaft will not be driven by the engine.

When the operator releases the pedal 41, the spring 44 will operate to withdraw the pinion 33 from engagement with the engine gear. The release of the pedal 41 also permits the switch plunger 62 to return to switch-open position.

In case abutments should occur between the teeth 32 of the pinion and the teeth of the flywheel gear 22, the springs 51, which provide a yielding connection between the levers 45 and 54, will permit the lever 45 to be moved into the position shown in Fig. 2 to close the motor switch in order that the shaft 23 may be rotated. The movement of the lever 45 into the position shown in Fig. 2 while the pinion 33 is pressed against the flywheel gear 22, causes the spring 35 to be compressed and its convolutions to be drivingly connected with the clutch drums 29 and 30. Therefore, the rotation of the shaft 23 will cause the pinion 33 to be rotated into registry with the engine gear 22. When this occurs, the springs 51 which will have hitherto been compressed beyond their initial state of compression, will be released to cause the sleeve 26 and parts carried thereby to be moved quickly toward the right so as to move the pinion into engagement with the engine gear.

While the form of embodiment of the present invention constitutes a preferred form, it is to be understood that other forms might be adopted, all coming within the scope of the claims which follow:

What is claimed is as follows:

1. Engine starting apparatus comprising, in combination, a motor; a pinion movable endwise into mesh with a gear of an engine to be started; a clutch for automatically connecting the motor with the pinion when the motor is the driving member and including aligned clutch drums connected respectively with the motor and pinion, a helical spring having its convolutions normally out of power transmitting engagement with the drums, and means responsive to the operation of the motor for causing the spring to be stressed axially so that its convolutions will engage the clutch drums; and means for moving the pinion endwise.

2. Engine starting apparatus comprising, in combination, a motor; a pinion movable endwise into mesh with a gear of an engine to be started; a clutch for automatically connecting the motor with the pinion when the motor is the driving member and including aligned clutch drums connected respectively with the motor and pinion, a helical spring within the drums and having its convolutions normally out of power transmitting engagement with the drums, and means responsive to the operation of the motor for causing the spring to be compressed so that its convolutions will expand and engage the drums; and means for moving the pinion endwise.

3. Engine starting apparatus comprising, in combination, a motor; a shaft operated by the motor; a sleeve movable endwise along the shaft and driven thereby; a pinion movable endwise with the sleeve and normally rotatable around the sleeve; a clutch supported by the sleeve for connecting the pinion and sleeve comprising aligned clutch drums one of which is connected with the pinion, a helical spring within the drums and having its convolutions normally out of power transmitting engagement with the cylindrical walls of the drums, and means for drivingly connecting one of the drums with the sleeve and for causing said spring to be compressed when the motor is operated so that the convolutions of the spring will expand and engage the drums; and means for moving the sleeve endwise so that the pinion will mesh with a gear of the engine to be started.

4. Engine starting apparatus comprising, in combination, a motor; a shaft driven by the motor; a sleeve movable endwise along the shaft and driven thereby and having an externally threaded portion; a nut cooperating with said threaded portion; a pinion rotatable on the sleeve; aligned tubular clutch drums connected with the pinion and nut; a helical spring enclosed by said drums and normally out of driving engagement therewith, the end faces of the spring being in frictional engagement with the nut and pinion; and means for moving the sleeve endwise to move the pinion into mesh with the gear of an engine to be started.

5. Engine starting apparatus comprising, in combination, a motor; a pinion movable endwise into mesh with the gear of an engine to be started; a clutch for connecting the motor and pinion and including aligned clutch drums and a helical spring adapted to connect said drums but having its convolutions normally out of power transmitting engagement with the drums; means tending to stress the spring axially from normal condition in order that the spring convolutions will drivingly connect the drums, or permitting the spring to return to normal condition in order that the drums will be disconnected according, respectively, as to whether the motor or the engine is the driving member of the pinion; and means for moving the pinion into mesh with the engine gear.

6. Engine starting apparatus comprising, in combination, a motor; a pinion movable endwise into mesh with the gear of an engine to be started; a clutch for connecting the motor and pinion and including aligned clutch drums provided interiorly with cylindrical clutch surfaces, and a helical spring located within the drums but having its convolutions normally out of power transmitting engagement with said surfaces; means tending to compress the spring from normal condition in order that its convolutions will expand and drivingly connect the clutch drums, or permitting the spring to return to normal condition in order that the drums will be disconnected according, respectively, as to whether the motor or the engine is the driving member of the pinion; and means for moving the pinion into mesh with the engine gear.

In testimony whereof I hereto affix my signature.

GEORGE W. ELSEY.